United States Patent [19]

Harrell

[11] Patent Number: 4,527,711

[45] Date of Patent: Jul. 9, 1985

[54] VENDING MACHINE FOR EDGE ENGAGING AND DISPENSING SINGLE ARTICLE

[75] Inventor: Bob G. Harrell, Carrolton, Miss.

[73] Assignee: News Vend 1, Inc., Greenwood, Miss.

[21] Appl. No.: 512,455

[22] Filed: Jul. 11, 1983

[51] Int. Cl.[3] .......... B65G 59/02

[52] U.S. Cl. .......... 221/244; 221/274

[58] Field of Search .......... 221/210, 274, 244; 214/217, 219; 271/42; 194/2

[56] References Cited

U.S. PATENT DOCUMENTS

| | | | |
|---|---|---|---|
| 382,521 | 5/1888 | Galland | 221/232 |
| 744,673 | 11/1903 | Balsley | 221/232 |
| 1,314,217 | 8/1919 | Roberts | 221/232 |
| 1,600,623 | 9/1926 | Chesnut et al. | 221/232 |
| 1,702,925 | 2/1929 | Ashe | 221/232 |
| 1,749,233 | 3/1930 | Scott | 221/232 |
| 1,914,546 | 6/1933 | Whiting | 221/232 |
| 1,938,753 | 12/1933 | Niederstadt | 221/232 |
| 1,997,080 | 4/1935 | Reiners et al. | 221/232 |
| 2,263,040 | 11/1941 | Kaltenback | 312/55 |
| 2,510,197 | 6/1950 | Summerfield | 221/232 |
| 2,522,033 | 9/1950 | Graham | 312/56 |
| 2,819,817 | 1/1958 | Mackenzie et al. | 221/244 X |
| 2,968,422 | 1/1961 | Watlington | 221/232 |
| 3,062,406 | 11/1962 | Kent et al. | 221/232 |
| 3,063,597 | 11/1962 | Burdis et al. | 221/232 |
| 3,082,912 | 3/1963 | Hawks | 221/213 |
| 3,100,061 | 8/1963 | Carter et al. | 221/232 |
| 3,104,781 | 9/1963 | Clift | 221/232 |
| 3,114,475 | 12/1963 | Etes | 221/232 |
| 3,655,092 | 4/1972 | Hall et al. | 221/244 X |
| 3,709,405 | 1/1973 | Harris | 221/232 |
| 3,957,175 | 5/1976 | Gordon | 221/215 |
| 3,960,291 | 6/1976 | Navi | 221/232 |
| 4,085,863 | 4/1978 | Johnson | 221/20 |
| 4,365,701 | 12/1982 | Armstrong et al. | 194/22 |

*Primary Examiner*—Stanley H. Tollberg

*Attorney, Agent, or Firm*—Alexander, Unikel, Bloom, Zalewa & Tenenbaum, Ltd.

[57] ABSTRACT

An article dispensing machine, such as a newspaper vending machine, operable in response to insertion of an appropriate coin, or plurality of coins, has a mechanism which edge engages and dispenses one uppermost article, such as a newspaper, to the purchaser when a mechanism actuator unlocked by insertion of the coins, is manually operated. Upon return to its original position after dispensing one newspaper the actuator cannot be operated again until unlocked by another insertion of appropriate coins.

14 Claims, 10 Drawing Figures

VENDING MACHINE FOR EDGE ENGAGING AND DISPENSING SINGLE ARTICLE

BACKGROUND OF THE INVENTION

1. Field of the Invention

This invention relates to coin operated vending machines which dispense one article, such as a newspaper, to each customer in response to deposit of an appropriate value of payment.

2. Description of the Prior Art

Sale of articles, such as newspapers, by machine has long been accomplished by so called "honor" boxes in which the customer inserts appropriate coins to gain access to a stack of newspapers within an enclosure having a coin actuated lock. The customer is expected to take one article and generally most do. However at some locations the entire stack of newspapers consistently disappears upon payment for only one or a few of the papers. Such lack of payment for product received results in significant loss of revenues to vendors.

Therefore, there has been a long-felt need to provide a newspaper vending machine which will provide access to, or dispense, only one paper to an inserter of appropriate payment.

U.S. Pat. Nos. 2,263,040; 2,522,033; 3,082,912 and 3,957,175 each show prior art attempts to provide a newspaper vending machine which gives each coin inserter access to only one paper.

U.S. Pat. Nos. 2,263,040 and 3,957,175 each show the use of pointed objects which partially penetrate at least a portion of the surface of one paper at the bottom of a stack to enable the paper to be forced partially out a slot to give the customer access to it.

U.S. Pat. No. 2,522,033 shows a dispensing member with sharp points which forces a portion of the top paper on a stack out a slot.

U.S. Pat. No. 3,082,912 shows a newspaper or magazine vending machine in which one copy is pushed out a vertically oriented slot in the side of the machine.

U.S. Pat. No. 4,085,863 discloses a vending machine for dispensing one article at a time from the bottom of a stack by contacting an edge of the article.

U.S. Pat. No. 4,365,701 discloses a vending machine for vending newspapers one at a time and provides a good background discussion of the inherently weak and fragile characteristics of newspapers and the consequent difficulties in dispensing them.

Typical prior art attempts to make commercially acceptable coin responsive one-at-a-time newspaper dispensing machines have failed due to complexity of the dispensing mechanisms, defacing surface engagement of the newspaper and/or difficulty in loading newspapers into the machines.

SUMMARY OF THE INVENTION

A newspaper vending machine has a coin receiver releasable actuating member. Upon insertion of appropriate coins, the coin receiver serves to trip a releasable lock on an actuator member to enable the customer to manually move the actuating member.

Movement of the actuating member causes a paper engagement member carried by a carriage which traverses a stack of newspapers enclosed to be inaccessible to the public to engage in a nondefacing manner an unfolded edge portion of the top or uppermost newspaper on the stack and slide that top paper forward to a position where it falls by gravity into an accessible hopper where it can be picked up by the customer.

Upon depletion of the stack of newspapers, the engagement member forces a trip plate forward whereby a display newspaper is released to the customer and an indication that the machine is empty is provided to later arriving prospective customers.

The newspaper engagement member can be adjusted or positioned for use to slide or dispense thick, heavy newspapers, such as Sunday editions, as well as generally thinner, lighter weight daily editions.

DETAILED DESCRIPTION OF THE PREFERRED EMBODIMENT

Figures 1, 2, 3:
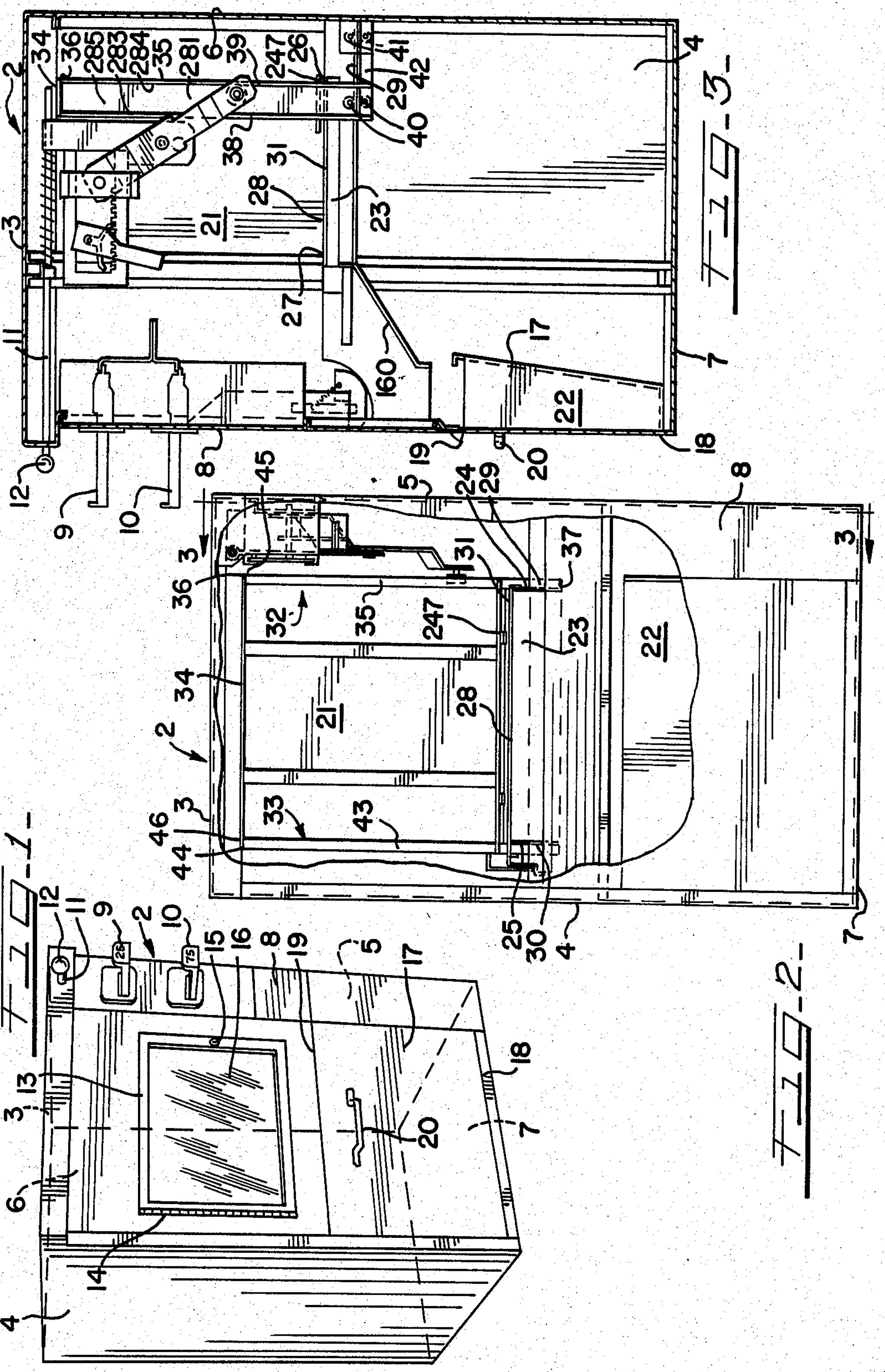
FIG. 1 is a perspective view showing the exterior of a vending machine of this invention.
FIG. 2 is a front view of the machine shown in FIG. 1 in which the front panel has been cut away.
FIG. 3 is a side section view of FIG. 2 as indicated by section line 3—3.

FIG. 1 is a perspective view of a machine 2 of this invention. Machine 2 is comprised of an enclosure means having a top panel 3, a side panel 4, a second side panel 5, a back panel 6, a bottom panel 7 and a front panel 8.

The front panel 8 has a value receiver means, such as coin receivers 9 and 10, an actuator means, such as linearly movable actuator member or bar 11 having a knob 12 to facilitate gripping and pulling of the actuator bar 11. A selectively lockable access means, such as machine access and display door 13, is placed on and covers an access opening in the front panel 8 of the machine. Door 13 is pivotally affixed to panel 8 by appropriate means, such as a hinge 14, and is provided with an access limiting locking means, such as key operated lock mechanism 15. A transparent display area, such as transparent glass panel 16, is provided within the door to display to the prospective customer the goods, such as a newspaper, which are offered.

Below loading and display door 13 is a normally accessible article receiving means, such as hopper 17. Hopper 17 is pivotally engaged, such as along a bottom portion 18, with machine 2. Means, such as a handle 20, to facilitate enabling a customer to swing out a top portion 19 is provided near the top of hopper 17.

Door 13 is normally locked when the machine is in use and is unlockable by vendor personnel for purposes of placing a plurality of articles such as newspapers, stacked one upon another, in the machine.

Hopper 17 is normally unlocked and accessible by being manually openable to allow access to an accessible portion 22 of the machine.

FIG. 2 is a front elevation view of the machine 2 shown in FIG. 1 from which a portion of front panel 8 and its associated structural elements have been cutaway as indicated and FIG. 3 is a side elevation full section view of the machine 2 shown in FIGS. 1 and 2. As the section line 3—3 on FIG. 2 indicates, side panel 5 has essentially been removed or cut away.

Referring to FIGS. 2 and 3, the panels 3, 4, 5, 6, 7 and 8 provide a normally inaccessible machine portion 21 and a normally assessible machine portion 22. As shown, coin receivers 9 and 10 and actuator bar 11 and actuator knob 12 are accessible on the front of the machine.

Located within normally inaccessible machine portion 21 is structure for supporting and moving or dispensing an article.

This structure is comprised of an article support means, such as article support platform 23. Support platform 23 has an article support surface 28 having a first side 24, a second side 25, a rear portion 26 and a front portion 27. Support surface 28 is adapted for supportingly receiving one or more articles, such as a plurality of newspapers (not shown) stacked one upon another.

A pair of guide members, such as first guide member. 29 and second guide member 30 are affixed adjacent support platform 23. As shown, first guide member 29 is positioned and affixed substantially parallel and adjacent to first side 24 of platform 23 and second guide member 30 is positioned and affixed substantially parallel and adjacent to second side 25 of support platform 23.

Optionally, but preferably, a display paper trip means, such as trip plate 31, is placed on support surface 28 and articles are placed and supported on top of the trip plate.

An article movement mechanism is placed in the inaccessible portion 21 of the machine and coacts with support platform 23 to move an article relative to support surface 28. The article movement mechanism is comprised of a traversing means or carriage which traverses or noncontactingly moves over support surface 28. This traversing means or carriage is comprised of a first side assembly 32, a second side assembly 33 and a bridge member 34.

As best shown in FIG. 3, carriage side assembly 32 is comprised of a substantially vertically extending member 35 having an upper terminal end 36, a lower terminal end 37, and a pair of parallel substantially vertically extending sides 38 and 29. A friction reducing mean, such as a roller bearing assembly having a first set of roller bearings 40 and a second set of roller bearings 41 connected together by connective member 42 is affixed to a lower end portion of member 35 substantially adjacent lower terminal end 37. Each set of roller bearings is slidably or movingly engaged with first guide member 39.

Carriage side assembly 33, having a vertically extending member 43 having a upper terminal end 44, is substantially a mirror image construction of the immediately above described construction of carriage side assembly 32. Carriage side assembly 33 also has a roller bearing assembly and it is slidably or movingly engaged with second guide member 30. Bridge member 34 has a first end portion 45 rigidly engaged with vertical member 35 adjacent terminal end 36 and a second end portion 46 rigidly engaged adjacent upper terminal end 44 of vertical member 43. Bridge member 34 substantially rigidly connects carriage side assemblies 32 and 33 together to assure that when assembly 32 is caused to move along guide member 29 assembly 33 moves similarly along guide member 30 for causing the entire traversing means or carriage to traverse or non-contactingly move over support surface 28 from a first position substantially adjacent to rear portion 26 of platform 23 to a second position substantially adjacent the front portion 27 of platform and from the second position back to the first position.

An article engagement member 247 having an article engaging means 248 is engaged with each carriage side assembly 32 and 33. As will be more specifically described later in this specification article engagement member 247 is connected to the support surface traversing carriage in a manner which causes it to move substantially nonvertically or horizontally as the carriage moves and enables it to move vertically with respect to the carriage.

Figure 4:
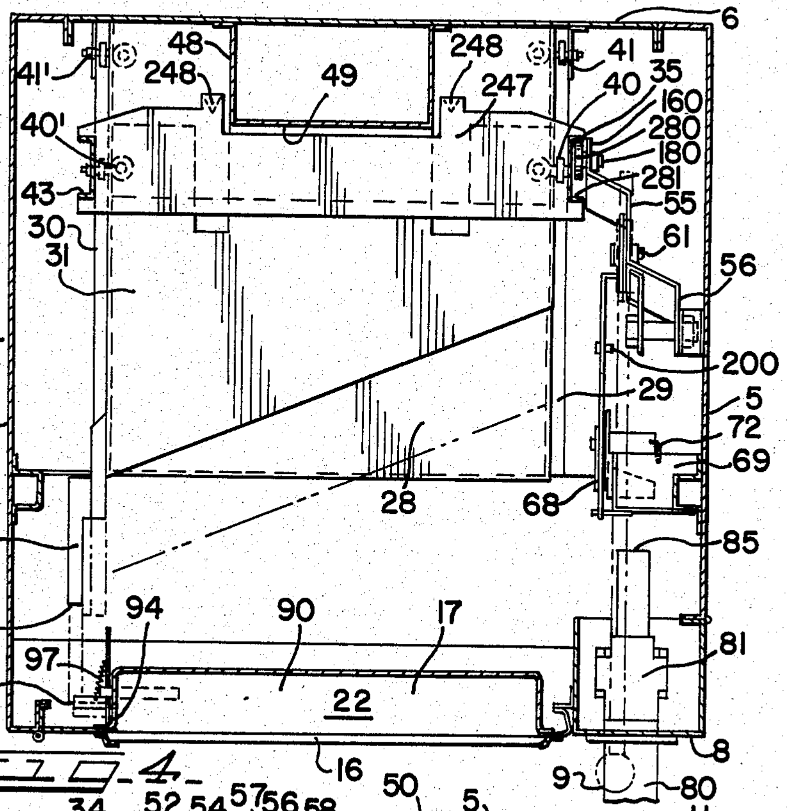
FIG. 4 is a top plan view of FIG. 2 from which the top panel has been cut away.
Figure 5:
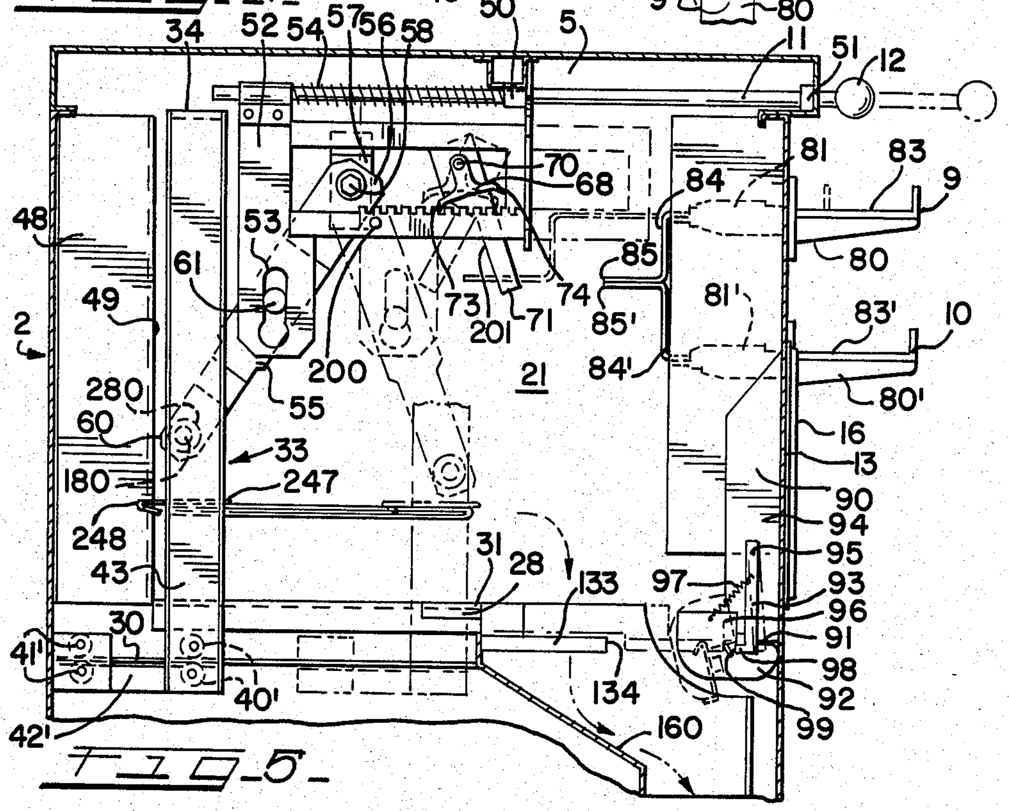
FIG. 5 is an enlarged side view showing the actuating mechanism of the invention.

FIG. 4 is a top plan view of FIG. 2 in which the top panel 3 and bridge member 34 have been omitted and the actuating rod 11 has been shown in phantom for clarity and FIG. 5 is an enlarged side view showing the actuating mechanism of the machine 2.

As shown in FIG. 4, a paper stop member 48 extends outwardly from panel 6 toward the front panel 8 of the machine. Paper stop member 48 has a front facing substantially vertically extending paper stop and edge alignment surface 49 against which the edges of a plurality of newspapers stacked one upon the other may be positioned.

As seen in FIG. 5, an actuator means comprised of actuator rod 11, mounting collars 50 and 51 and forcing bracket 52 is enclosed within inaccessible portion 21 of the machine. The actuating means is actuatable manually by knob 12 which is rigidly affixed to rod 8 to enable access to it. Collars 50 and 51 are affixed to the machine and rod 11 is linearly or axially slidable through them. Forcing bracket 52 is rigidly affixed to rod 11 for movement with the rod. Forcing bracket 52 is provided with an enlongated substantially vertically extending opening or slot 53. A biasing means, such as helical spring 54 is provided between fixed collar 50 and bracket 52 for resiliently biasing or urging actuator rod into its normal or first position substantially as shown in solid lines in FIG. 5.

Refering to each FIGS. 4 and 5, a connective means is provided for connecting actuator forcing bracket 52 of the actuator means to the traversing means or carriage vertical member 35. The connective means is comprised of linkage arm 55 which has a first end portion 56 pivotally engaged to a fixed mounting means comprised of mounting bracket 57 affixed to panel 5 and a pin or bolt 58 which pivotally engages the end portion 56 of arm 55 to bracket 57.

Linkage arm 55 has a second end portion 60 which is pivotally engaged by a pin or bolt 180 to a roller 280 which rollingly engages a channel 281 of member 35 of the traversing carriage. As best shown in FIG. 3 channel 281 is defined by two parallel sides 283 and 284 which axially extend from a connective surface 285 of member 35 to form a U-shaped channel.

Intermediate end portions 56 and 60 of linkage or connecting arm 55 is a pin 61 which is affixed to arm 55 and pivotally and slidably engages elongated opening or slot 53.

Figure 7:
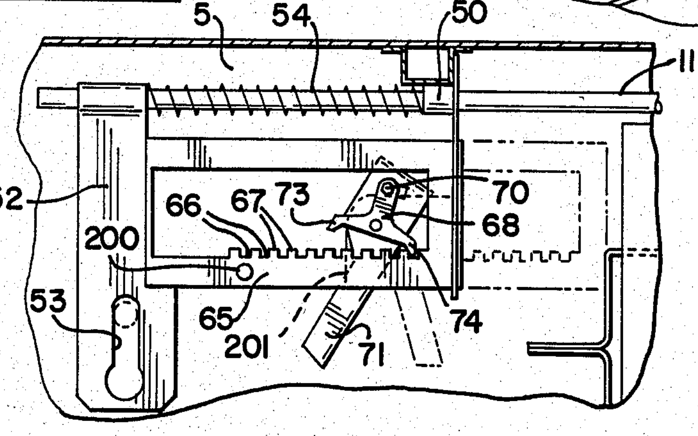
FIG. 7 is an enlarged partial view of the actuating mechanism shown in FIG. 5 in which the pawl is in the unlocked position.

FIG. 7 shows an enlarged side view of a locking means for preventing operation of the actuating means. The locking means is comprised of a rack gear member 65 having a series of notches 66 which define a plurality locking teeth 67. A locking pawl 68 having a locking position, as shown in FIG. 5, and an unlocking position, as shown in in FIG. 7, is pivotally engaged with a mounting bracket 69 affixed to panel 5 by a pivot pin or bolt 70 mounting bracket 69 as best shown in FIG. 4. Rack gear member 65 is affixed to forcing bracket 52 for movement with actuator member 11.

Also pivotally engaged with bracket 69 is a locking arm 71. Locking arm 71 and pawl 68 are affixed to each other for pivotal movement together about pivot pin 70. Pawl 68 and arm 71 are arranged to be resiliently biased by means, such as a spring 72, as indicated in FIG. 4, to be either in the lock position shown in FIG. 5 or in the unlock position shown in FIG. 7. This arrangement is of the well-known "over center" type in which the spring 77 biases the pawl and arm to a first or second position upon movement of the members beyond a pivotal center point. In the lock position, a locking engagement portion 73 of pawl 68 interferingly engages one of the teeth of the rack gear 65 and prevents linear movement or withdrawal of actuator member 11 from the machine.

In the unlock position as shown in FIG. 7 an unlocking engagement portion 74 of the pawl 68 contacts rack gear teeth 67 but merely deflects upwardly against the resilient urging of spring 72 and is therefore unable to prevent withdrawal of actuator rod 11. Also, in this position portion 74 prevents inward movement of rod 11 and therefore prevents another or second article from being engaged on one coin deposit.

As best shown in FIG. 5, a coin deposit responsive unlocking means is provided to move lock arm 71 and pawl 68 from the locked to the unlocked position.

A monetary value receiver and discriminator, such as coin receiver mechanism 9, is affixed to front panel 8. Coin receiver 9 is movable linearly or axially inward upon deposit of a predetermined amount of coins in it. Such mechanisms are commercially available and one such mechanism is Model GX5-90 manufactured by Shipman Manufacturing Company, Inc.

Typically such mechanisms, as shown, have a linearly movable slide member 80 slidably mounted within a coin receiving mechanism 81 which is affixed to the machine by appropriate mounting means, such as mounting bracket 82. Slide member 80 has an external coin receiving and push portion 83 and an inner actuating portion 84 having a terminal end 85.

Upon deposit of the requisite coins the slide 80 may be pushed inwardly for causing terminal end 85 of inner portion 84 to contact arm 71. Continued inward movement of slide 80 causes terminal end 85 to force arm 71 and pawl 68 affixed to arm 71 to pivot about pin 70 and move from the lock position to a beyond-center position whereby the spring 72 biases it to the unlock position to enable manual withdrawal of actuator rod 11 from the machine.

A second coin receiver 10 may be provided to receive a second predetermined amount of coins. For example, receiver 9 may require a twenty-five cent payment appropriate for a daily edition of a newspaper and receiver 10 may require another amount, such as a seventy-five cent payment for a Sunday edition of a newspaper. Inner portion 84 of slide 80 may be swung out of its normal position whereby actuation of slide 80 would not provide contact of terminal end 85 with arm 71 and consequently pawl 68 would keep actuator rod locked to prevent its axial withdrawal from the machine. To illustrate this feature, interior portion 84 of slide 80 is shown in the swung out position in FIG. 6.

As shown in FIG. 5, a display compartment 90 is provided in door 13 behind transparent member 16. A newspaper (not shown) may be placed in a vertical position in compartment 90 to allow prospective customers to view the paper. Upon depletion of all papers in the machine it is desirable to also have the machine dispense this display paper. To this end bottom portion 91 of area 90 is provided with a tripable, spring biased paper support member 92.

Member 92 is maintained in its paper support position by a latching member 93 pivotally mounted to door member 94 by a pivot pin 95. Member 92 is also pivotally mounted to door member 94 by suitable means such as a pivot pin 96. Member 92 is urged to an open or paper nonsupporting position by a spring 97. Latching member 93 has a projecting portion 98 which engages a mutually coacting slot portion 99 in member 92 and the latching member 93 holds the member 92 in a closed or paper supporting position against the urging of spring 97. Upon pivotal movement of latch member 93 away from member 92 projecting portion 98 is caused to disengage slot portion 99 and the spring urges the member 92 to an open or paper nonsupporting position. The paper then falls by gravity into the hopper 17 immediately below compartment 90. The paper may then be manually removed from the hopper.

Figure 8:
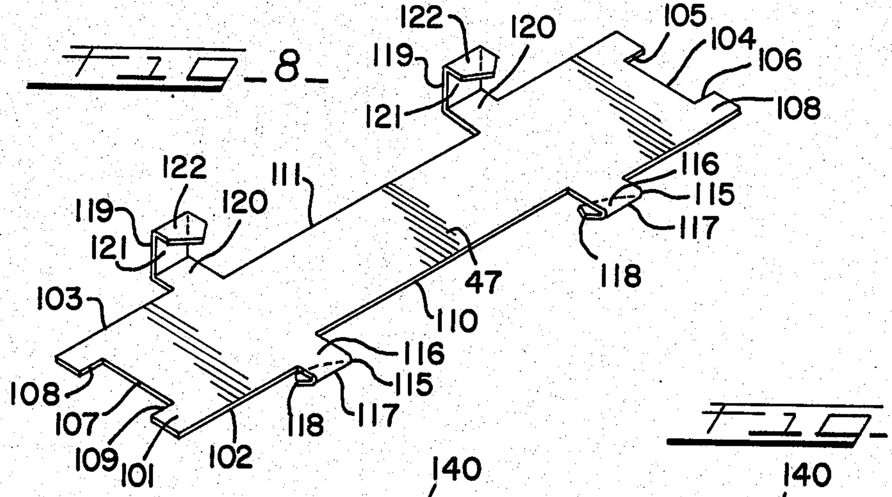
FIG. 8 is a perspective view showing a preferred alternate embodiment of the article engagement member shown in FIGS. 5 and 6.

FIG. 8 is a perspective view of an alternate preferred embodiment of the article engaging member 247 of this invention. Article engaging member 47 is comprised of a substantially flat planar body portion having a first end portion 100 and a second end portion 101 and a first side portion 102 and a second side portion 103.

First end portion 100 has a notched portion defined by an end edge 104, a first side edge 105 and a second side edge 106.

Second end portion 101 has a notch portion defined by an end edge 107, a first side edge 108 and a second side edge 109.

First side portion 102 has a paper stop clearance edge 110 extending longitudinally of a portion of member 47 and second slide portion 103 has a paper stop clearance edge 111.

Connected to a portion of first side portion 102 is an article engagement means comprised of a first pair of laterally extending article engagement hooks 115 which depend vertically out of the plane of the body portion. Each hook 115 has a first laterally outwardly extending portion 116, a second substantially downwardly extending tansitory portion 117 and a third substantially laterally inwardly extending portion 118.

Connected to a portion of second side portion 103 is an article engagement means comprised of a second pair of laterally extending article engagement hooks 119 which extend vertically upwardly out of the plane of the body portion. Each hook 119 is comprised of a first laterally outwardly extending portion 120, a second substantially upwardly extending transitory portion 121 and a third laterally inwardly extending portion 122.

End portions 100 and 101 are configured and dimensioned to coact with vertical extending carriage members 35 and 43. Each notched end portion is adapted to receive a vertical member 35 and 43 whereby the first and second side edge of each notch portion interferingly engage a side portion of the vertical carriage member and the engagement member 47 is forced to traverse the support surface in a substantially nonvertical or horizontal direction as the carriage traverses the support surface.

However, the notches are sized to fit loosely about the vertical carriage members for enabling member 47 to freely slide up and down with respect to the vertically oriented carriage members. This same connective or engagement relationship is provided between member 247 and members 35 and 43 as shown in FIGS. 2, 3, 4, 5 and 6.

As shown in FIG. 8, the transitory portions 121 of article engagement hooks 119 extend considerably farther vertically than do the transitory portions 117 of hooks 115. In other words, hooks 119 have a considerably greater depth or hooking capacity than hooks 115 do. Hooks 115 are designed for use to engage an edge portion of relatively thin articles, such as a typical daily edition of a newspaper and hooks 119 are designed for use to engage a thicker article, such as a typical Sunday edition of a newspaper. A great variety of different sizes and configurations of article hooks may be designed to accommodate a variety of articles sizes as long as a plurality of articles of one article size are loaded into the machine and one hook size is selected so only the uppermost or top article is engaged for each traverse of the carriage.

Essentially article engagement member 247, as shown in FIGS. 2, 3, 4 and 6, is identical to alternate article engagement member 47 shown in FIG. 8 with the exception that member 247 has only one article engagement means corresponding to hooks 115 of member 47 of FIG. 8 and embodiment 47 of FIG. 8 is adjustable to accommodate two classes of articles in which the thickness of the articles in one class is substantially different than the articles in the other class.

Article 47 of FIG. 8 is adjustable in that when placed in the machine and engaged with the carriage with the hooks 115 rearwardly and downwardly oriented it would be disposed to engage a portion of the edge of the uppermost article of a stack of relatively thin articles, such as a daily newspaper. Alternately when member 47 is positioned with hooks 119 rearwardly and downwardly member 47 would be disposed to engage an edge portion of and move one relatively thicker article, such as the Sunday edition of a newspaper.

In practice it may be necessary or preferable to provide a plurality of article engagement members with each machine. Each member would have two pairs of hooks of which each pair would have a different vertical dimension. The loading personnel would select the optimum hook size for the articles to be dispensed on that loading, and place the article engagement member having that size of hooks on the machine for those articles.

Figure 9:
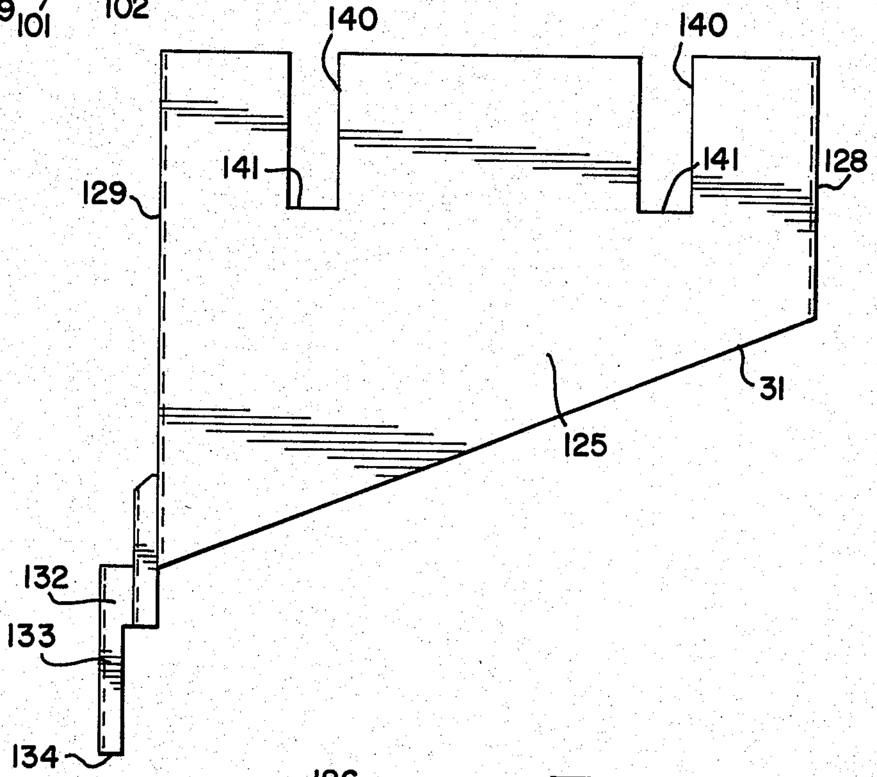
FIG. 9 is a top plan view showing the display latch trip member of this invention.
Figure 10:
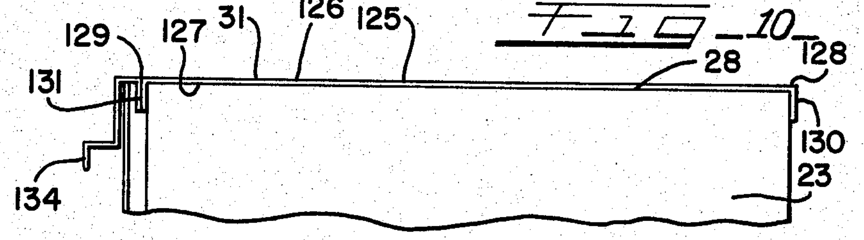
FIG. 10 is a front view of the member shown in FIG. 9.

FIGS. 9 and 10 show a plan view and a front elevation view of a trip plate 31. Trip plate 31 is comprised of a flat or substantially planar plate portion 125 having an upper surface 126 and a lower surface 127. Flat portion 125 has a first side 128 and a second side 129. First side 128 has a downwardly extending guide flange 130 and second side 129 has a downwardly extending guide flange 131. Lower surface 127 is positioned to rest on support surface 28 of platform 23 and guide flanger 130 and 131 are spaced a small distance lateral outwardly from sides 24 and 25 respectively of support platform 23.

Flat plate portion 125 rests on and is slidably movable, guided by guide flanges 130 and 131, along platform 23. A trip bar 132 is affixed to a portion of side 131 of flat portion 125. As shown, trip bar 132 is laterally offset from side 131 and has a forwardly extending portion 133 which has a forward terminal end 134.

Two slots 140 are formed in the plate portion 125. These slots are dimensioned and spaced to receive article engagement hooks of article engagement member 47. Upon engagement of the hooks with the forward edge 141 of the slots the trip plate 31 is forced forward on the support platform to cause, as best shown in FIG. 5, terminal end 134 to engage and unlatch latching member 96 from 92 member to cause the display paper in display compartment 90 to drop into hopper 17 for removal by the customer. Preferable, a message is printed on the back of the compartment holding the display paper whereby upon release of the display paper prospective customers are informed that the supply of papers in the vending machine has been depleted.

Having described above, in detail, the structural elements of this invention a detailed description of one cycle of this invention is provided below.

Figure 6:
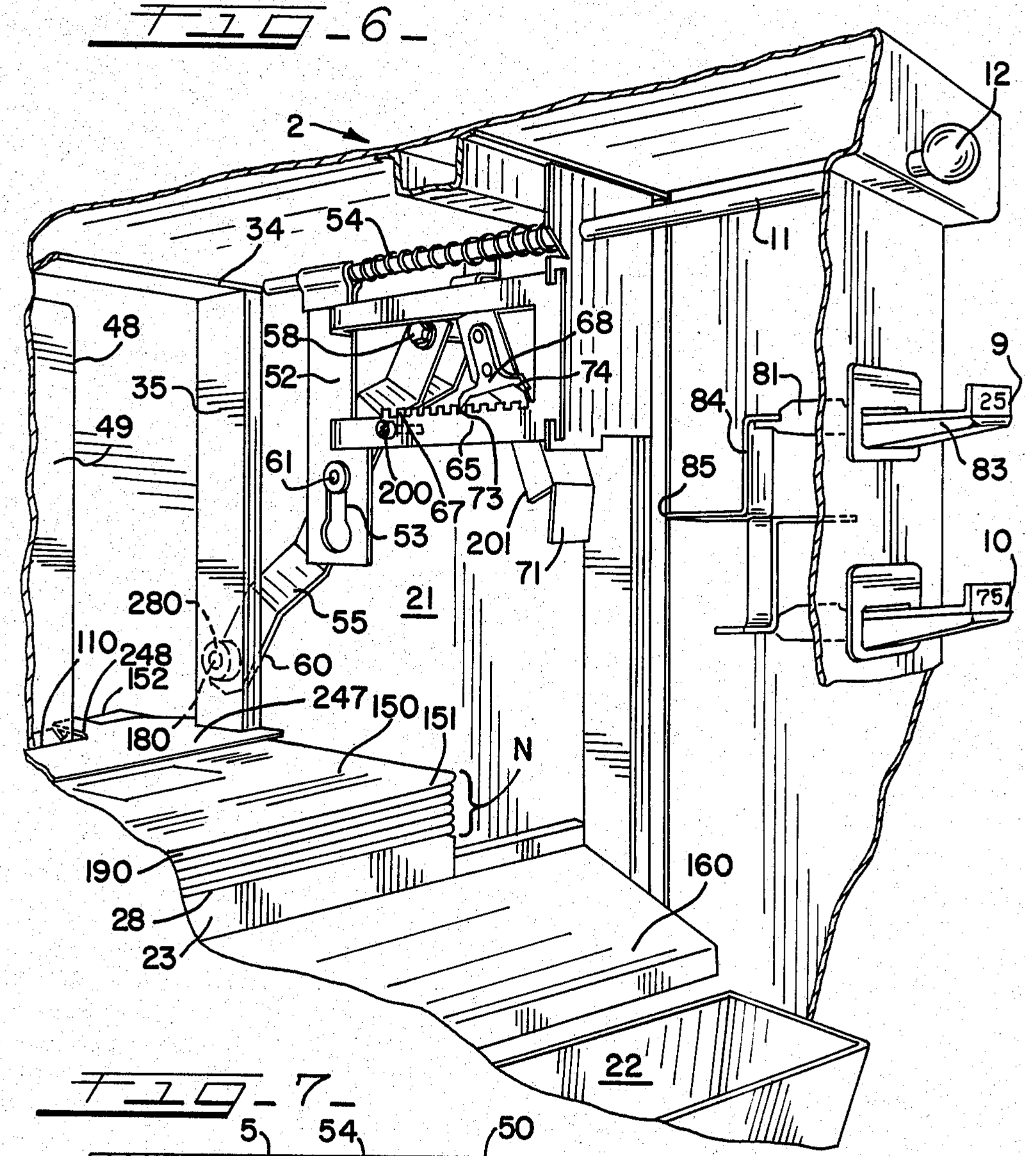
FIG. 6 is an enlarged cutaway perspective view showing the actuating mechanism of the invention.

Referring to FIG. 6, a plurality of articles placed one upon another, such as the stack of newspapers N, have been placed on the support surface 28 of support platform 23.

To place the newspapers on the platform the loading personnel would have unlocked door 13 as shown in FIG. 1 to gain access to normally inaccessable portion 21 of the enclosure substantially as partially shown in FIG. 6. Upon gaining access trip arm 71 would be manually tripped from the lock position shown to the unlock position to disengage portion 73 from the locking teeth 67 of rack gear 65. Actuator rod would then be pulled linearly outward to cause members 35 and 247 to move forward so hooks 248 clear paper stop 48. Member 247 can then be lifted up by one end to clear member 25 and then pulled forward by the lifted end to disengage member 43. Member 247 would them be removed from the machine and actuator member would be released and arm 71 positioned to enable spring 54 to force the actuator rod and carriage back to their normal position shown in FIG. 6. Any unsold newspapers would be removed and replaced by the the stack of newspapers N.

Each newspaper in stack N has a folded edge 151 and an unfolded edge 152. As shown, the folded edge 151 of each newspaper is placed toward the front portion of platform 23 and the unfolded edge 152 is preferably abuttingly placed against alignment surface 49 of paper stop 48.

An engagement member, such as member 247 or one of the pairs of hooks of member 47, is then selected by the loading personnel based on the thickness of the unfolded edge 152 of each paper. It is desirable that the edge engaging members or hooks 115 have a vertically extending transitory portion sufficient to enable the hook to engage at least about one third of the thickness of the unfolded edge 152 of each paper. This amount of edge contact has been found desirable to assure that the entire newspaper so engaged will move horizontally forward as the engagement member moves forward with the carriage. The selected engagement member is then placed into engagement with the carriage members and disposed to engage the unfolded edge 152 of top or uppermost newspaper 150.

The loading personnel then make sure only one linear actuating member such as 84 of coin deposit mechanism 9 is operable and the other, such as 84 of deposit mechanism 10, is placed in an inoperable position as shown.

Unlocking arm 71 would then be repositioned in the locked position shown in FIG. 6 and the door 13 would be closed and locked to make the stack of newspapers N inaccessible in portion 21 of the enclosure of machine 2.

Upon deposit of appropriate coins to equal twenty-five cents a customer is able to push member 83 inward to cause terminal end 85 of internal portion 84 to engage locking arm 71 and cause it and pawl 68 engaged with it to pivot about pivot pin 70 (as shown in FIG. 5) to remove lock portion 73 from engagement with teeth 67 of rack gear locking member 65. Slide members 83 and 84 are then normally automatically returned by a spring to the position shown.

The customer then grasps knob 12 of actuator rod 11 and manually pulls the rod linearly or axially outward as far as it will go against the urging of spring 54. Outward movement of rod 11 causes forcing bracket 52 and rack gear 65 to move along with the rod. As forcing bracket 52 moves outwardly pin 61 in elongated slot 53 is forced to slidably pivot within slot 53. Because pin 61 is rigidly affixed to an intermediate portion of connecting on linkage arm 55 and the upper end of arm 55 is pivotally connected to a fixed portion of the machine, arm 55 is forced to pivot about pivot pin or bolt 58. As the arm 55 pivots about the pin 58 the lower end portion 60 of arm 55, which is pivotally and rollingly engaged with channel 281 of carriage member 35 by pivot pin 180 and roller 280 is forced to move forward.

Forward movement of lower portion 60 of arm 55 causes consequent forward movement or traversing of the carriage members along the carriage guides from the back toward the front of platform 23. Consequently, engagement member 247 which is engaged by hooks 248 with the edge 152 of top paper 150 causes the paper 150 to slide forward over its support surface which is newspaper 190 supportingly beneath it.

As the actuator rod 11, forcing bracket 52, lower end 60 of arm 55, the traverse carriage members 35 and 43, engagement member 47 and the uppermost paper 150 move forward a reset pin 200 on rack gear 65 engages a portion 201 of locking arm 71 and pivots it back to the lock position shown in FIG. 6. Pin 200 is positioned so that arm 71 is swung back into the lock position substantially at the point where rod 11 reaches its point of maximum withdrawal from the machine and paper 150 has been slid forward over paper 190 to a second or most forwardly position on paper 190 whereby a major portion of paper 150 now unsupportingly hangs or droopingly projects out over inclined ramp 160.

FIG. 5 best shows in phantom lines the most forwardly or second position of the actuator means, connective means traversing means and unlocking means. The newspaper 150 substantially follows the path indicated by the flow arrow shown in FIG. 5.

The customer now releases knob 12, and urged by spring 54, rod 11 automatically retracts into the machine and the rack gear, forcing bracket, arm 55, the carriage and the engagement member are all consequently forced to their original positions as show in FIG. 6.

As the traversing carriage and the engagement member move from the front position toward the rear impelled by spring 54, the hooks 248 and the body portion of member 247 disengage from substantially unsupportingly positioned paper 150 and this paper falls by gravity off paper 190 onto inclined ramp 160 and falls into accessible portion 22 of the machine by falling into hopper 17. Some articles, particularly thick or heavy ones, such as a Sunday edition of a newspaper, may fall off the stack onto ramp 160 prior to commencement of retractive or rearward movement of the carriage and article engagement members. The customer may then grasp handle 20, swing out top portion 19 of hopper 17 and manually remove the paper.

During reverse or rearward movement of the carriage and engagement member the hooks 248 substantially unresistingly glide or slide over the top surface of the now top or uppermost newspaper 190. Upon full retraction or rearward movement hooks 248 are forced sufficiently far back so the laterally inwardly extending portions, such as portions 118 or 122 shown in FIG. 8, clear rear edge 152 of paper 190 and upon clearing the edge the hooks move or fall substantially vertically downward to be positioned to engage preferably one third or more of the thickness of unfolded edge 152 of paper 190.

One cycle is now completed, one newspaper has been moved from the normally inaccessible portion to the accessible portion of the machine and the machine is ready for the next customer to repeat the cycle.

Upon depletion of the stack of newspapers N hooks 248 engage trip plate 125 of surfaces 141 of slots 140 to, on the next cycle, force the trip plate forward along platform 23. Forward movement of trip plate 125 causes terminal end 134 of forward extending trip member 133 to interferingly engage latching member 93. Continual forward movement pivots latching member 93 about pin 95 to force latch shoulder 98 out of latch slot 99. Spring 97 thereby is able to cause display paper retaining member 92 to pivot about pivot means 96 whereby it no longer supports the paper in display compartment 90. Consequently, the display paper falls by gravity into hopper 17 where it can be manually removed by the customer. A suitable message behind the display paper on a portion of the machine is now displayed to inform prospective customers that the machine is empty.

It is to be understood that the machine and mechanism of this invention can be used to dispense one at a time a variety of articles of the same size stacked one upon another.

Additionally, articles do not have to be moved by an unfolded edge. Even newspapers can be moved by contact with the fold edge using this machine and mechanisms. However, it has been found preferable to contact an unfolded edge of the article because the hooks need not be as precisely matched to the thickness of the edge. The folded edge of newspapers would require a hook quite precisely matched to the thickness of a particular edition of the paper to prevent the hook from sliding over the edge and not moving the paper or, of less likelihood, engaging and moving two newspapers per cycle.

Contact by any edge is intended to be covered by the claims appended to this application.

What is claimed is:

1. An article dispensing machine for dispensing one article at a time, said machine comprising, in combination:

an article having an edge portion;

means for supporting said article;

means for enclosing said article for preventing uncontrolled access to said article;

means for traversing said supporting means;

a manually operable linearly movable pull bar pivotally linked to said traversing means for manually actuating said traversing means, said pull bar having affixed to it a member to it a member having equally spaced notches;

means for engaging at least a portion of said edge portion of said article, said engaging means being connected to said traversing means for causing said article to traverse said supporting means as said traversing means traverses said supporting means;

means for locking said pull bar, said locking means having a pawl coacting with said notches on said member affixed to said pull bar and having a locking position in which said pawl engages a notch in said bar and prevents movement of said bar in one direction to prevent said traversing means from traversing said support means; and means for unlocking said locking means for enabling said actuating means to cause said traversing means to traverse said supporting means;

whereby actuating said unlocking means unlocks said locking means for enabling said actuating means to cause said traversing means to traverse said support means for causing said article engagement means engaged with said portion of said article to force said article to an accessible location for enabling said article to be removed from said machine.

2. The invention defined in claim 1 together with a lockable access door on said enclosing means, said access door having a display compartment having a transparent display window for displaying an article and a trip door for enabling an article on display to fall from said display compartment to an accessible location for enabling removal of said display article from said machine and said article on said supporting means is a trip sheet whereby said article engagement means engages an edge portion of said trip sheet and causes it to trip said trip door of said display compartment as said traversing means traverses said supporting means.

3. The invention defined in claim 1 in which said article is a newspaper.

4. The invention defined in claim 3 in which said newspaper is the uppermost newspaper on a plurality of newspapers stacked one upon another.

5. The invention as defined in claim 1 in which said unlocking means is unlockable by receipt of an object of predetermined monetary value.

6. The invention as defined in claim 1 in which said unlocking means is unlockable by receipt of a coin.

7. The invention as defined in claim 1 in which said traversing means is a carriage arranged to pass over said article and said article support means.

8. The invention as defined in claim 7 in which said article engaging means is floatingly engaged with said carriage for causing said article engaging means to move substantially horizontally with said carriage and for enabling said article engaging means to move vertically with respect to said carriage.

9. The invention as defined in claim 1 in which said unlocking means is a coin receipt responsive linear actuator whereby upon placement of a coin in said actuator said actuator is manually movable linearly inward for moving said pawl from a locking position to an unlocking position for enabling manual operation of said pull rod.

10. In a newspaper vending machine for dispensing one newspaper at a time, said machine having a support platform for supporting a plurality of newspapers stacked one upon another, said support platform having a substantially horizontally disposed support surface having a rear end and a front end, said newspapers being positioned with a folded edge adjacent said front end of said support surface and an unfolded edge adjacent said rear end of said support surface, said unfolded edge of said plurality of each newspaper being substantially vertically aligned with each other, the improvement comprising:

carriage means for moving in a first direction from adjacent said rear end toward said front end of said support surface and for moving in a second direction from said front end toward said rear end of said support surface, said support surface having a first side and a second side and a first carriage guide member affixed substantially adjacent and parallel to said first side and a second carriage support member affixed substantially adjacent and parallel to said second side and said carriage means having a first vertically upwardly extending traversing member slidingly engaged with said first carriage guide member and a second vertically upwardly extending traversing member slidingly engaged with said second carriage guide member, a bar member extending from said first traversing member to said second traversing member, said bar member having a first end portion interferingly engaged with said first traversing member for being forced to move horizontally with said traversing member and slidingly engaged with said first traversing member for being able to move vertically with respect to said first traversing member and said bar member having a second end portion interferingly engaged with said second traversing member for being forced to move horizontally with said traversing member and slidingly engaged with said second traversing member for being able to move vertically with respect to said second traversing member and each of said first and said second traversing members having three vertically extending parallel surfaces and each end of said bar member having a notch for receiving a substantial portion of one of said traversing members; and engagement means for engaging at least a portion of said unfoled edge adjacent said rear end of said support surface of one uppermost newspaper above said support surface, said engagement means being engaged with said bar member for moving together with said bar member, whereby as said engagement means is disengaged from said newspaper as said carriage means is moved in said second direction said engagement means moves vertically downward with respect to said carriage means for being disposed to engage an edge portion of said uppermost newspaper on said support platform.

11. An article engaging member for moving one uppermost article from a plurality of articles placed one upon another in a vending machine, said member comprising, in combination:

a body member having a pair of end portions and a pair of side portions;

a three-sided notch for connecting each end portion to one of a pair of substantially vertically oriented members each having three parallel, substantially vertically oriented surfaces for causing said body member to be forced to move in a substantially nonvertical direction together with said pair of substantially vertically oriented members and for enabling said body member to move vertically with respect to said pair of substantially vertically oriented members; and means for engaging an edge of said one uppermost article of said plurality of articles, said engaging means being engaged with ore of said side portions of said body member.

12. An article engaging member for moving one uppermost article from a plurality of articles placed one upon another in a vending machine, said member comprising, in combination:

a substantially planar body member having a pair of end portions and a pair of side portions;

means for connecting each end portion to one of a pair of substantially vertically oriented members for causing said body member to be forced to move in a substantially nonvertical direction together with said pair of substantially vertically oriented members and for enabling said body member to move vertically with respect to said psair of substantially vertically oriented members; and means for engaging an edge of said one uppermost article of said plurality of articles, said engaging means having a first pair of article engaging hooks affixed to one of said pair of side portions of said body member, said hooks substantially depending in a vertical direction out of the plane of said body member and said engaging means having a second pair of hooks affixed to the other of said pair of side portions of said body member, said second pair of hooks extending substantially vertically upward out of the plane of said body member.

13. An article engaging member for moving one uppermost article from a plurality of articles placed one upon another in a vending machine, said member comprising, in combination:

a body member having a pair of end portions and a pair of side portions;

means for connecting each end portion to one of a pair of substantially vertically oriented members for causing said body member to be forced to move in a substantially nonvertical direction together with said pair of substantially vertically oriented members and for enabling said body member to move vertically with respect to said pair of substantially vertically oriented members; and means for engaging an edge of said one uppermost article of said plurality of articles, said engaging means being adjustable to engage an uppermost article of a plurality of articles having a first thickness and an uppermost articles of another plurality of articles having a second thickness.

14. The invention as defined in claim 12 in which one of said first and said second pair of hooks extend vertically further out of the plane of said body member than said other of said first and said second pair of hooks.

* * * * *